(12) United States Patent  (10) Patent No.: US 7,821,986 B2
Thomson et al.  (45) Date of Patent: Oct. 26, 2010

(54) WLAN INFRASTRUCTURE PROVIDED DIRECTIONS AND ROAMING

(75) Inventors: Allan Thomson, Pleasanton, CA (US); David Sheldon Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 815 days.

(21) Appl. No.: 11/443,823

(22) Filed: May 31, 2006

(65) Prior Publication Data

US 2007/0280152 A1  Dec. 6, 2007

(51) Int. Cl.
*H04W 4/00*  (2009.01)
(52) U.S. Cl. .................. 370/328; 370/338; 455/432.1; 455/434; 455/41.2; 455/456.1; 455/410
(58) Field of Classification Search . 340/995.1–995.19; 370/338, 328, 352, 401; 701/200–211; 455/41.2, 455/432.1, 456.1, 434, 436
See application file for complete search history.

(56) References Cited

U.S. PATENT DOCUMENTS

| | | | |
|---|---|---|---|
| 4,398,063 A | 8/1983 | Hass et al. | |
| 5,491,692 A | 2/1996 | Gunner et al. | |
| 5,564,079 A | 10/1996 | Olsson | |
| 5,623,495 A * | 4/1997 | Eng et al. | 370/397 |
| 5,654,959 A | 8/1997 | Baker et al. | |
| 5,684,860 A | 11/1997 | Milani et al. | |
| 5,940,384 A | 8/1999 | Carney et al. | |
| 5,987,011 A * | 11/1999 | Toh | 370/331 |
| 6,081,229 A | 6/2000 | Soliman et al. | |
| 6,097,596 A | 8/2000 | Cipolla et al. | |
| 6,104,928 A | 8/2000 | Waugh | |
| 6,112,095 A | 8/2000 | Wax et al. | |
| 6,115,605 A | 9/2000 | Siccardo et al. | |
| 6,134,448 A | 10/2000 | Shoji et al. | |
| 6,140,964 A | 10/2000 | Suguira et al. | |
| 6,167,274 A | 12/2000 | Smith | |
| 6,198,935 B1 | 3/2001 | Saha et al. | |
| 6,208,629 B1 | 3/2001 | Jaszewski et al. | |
| 6,212,391 B1 | 4/2001 | Saleh et al. | |
| 6,223,028 B1 | 4/2001 | Chang et al. | |
| 6,240,077 B1 | 5/2001 | Vuong et al. | |
| 6,243,413 B1 | 6/2001 | Beukema | |

(Continued)

FOREIGN PATENT DOCUMENTS

EP  0 930 514  7/1999

(Continued)

OTHER PUBLICATIONS

Dan Simone, 802.11k makes WLANs measure up, Networkworld. com, Mar. 29, 2004, http://www.networkworld.com/news/tech/2004/0329techupdate.html.

(Continued)

*Primary Examiner*—Sharad Rampuria
(74) *Attorney, Agent, or Firm*—Baker Botts L.L.P.

(57) ABSTRACT

In one embodiment, a method for facilitating maintaining wireless connectivity and roaming in wireless networks includes estimating a current location of the wireless client and determining a physical route and a wireless access point route based on the current location and a destination.

40 Claims, 9 Drawing Sheets

U.S. PATENT DOCUMENTS

| | | | |
|---|---|---|---|
| 6,249,252 B1 | 6/2001 | Dupray | |
| 6,259,406 B1 | 7/2001 | Suguira et al. | |
| 6,269,246 B1 | 7/2001 | Rao et al. | |
| 6,275,190 B1 | 8/2001 | Suguira et al. | |
| 6,282,427 B1 | 8/2001 | Larsson et al. | |
| 6,286,038 B1 | 9/2001 | Reichmeyer et al. | |
| 6,304,218 B1 | 10/2001 | Suguira et al. | |
| 6,332,077 B1 * | 12/2001 | Wu et al. | 455/432.1 |
| 6,338,140 B1 | 1/2002 | Owens et al. | |
| 6,400,722 B1 * | 6/2002 | Chuah et al. | 370/401 |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,473,038 B2 | 10/2002 | Patwari et al. | |
| 6,473,413 B1 | 10/2002 | Chiou et al. | |
| 6,526,283 B1 | 2/2003 | Janz | |
| 6,556,942 B1 | 4/2003 | Smith | |
| 6,611,502 B1 | 8/2003 | Steman | 370/256 |
| 6,664,925 B1 | 12/2003 | Moore et al. | |
| 6,728,545 B1 * | 4/2004 | Belcea | 455/456.2 |
| 6,754,488 B1 | 6/2004 | Won et al. | |
| 6,760,318 B1 | 7/2004 | Bims | |
| 6,760,671 B1 | 7/2004 | Batcher et al. | |
| 6,766,453 B1 | 7/2004 | Nessett et al. | 713/171 |
| 6,788,658 B1 | 9/2004 | Bims | |
| 6,799,047 B1 | 9/2004 | Bahi et al. | |
| 6,810,428 B1 | 10/2004 | Larsen et al. | |
| 6,879,574 B2 * | 4/2005 | Naghian et al. | 370/338 |
| 6,917,819 B2 | 7/2005 | Collins | |
| 6,925,069 B2 | 8/2005 | Koos et al. | |
| 6,925,070 B2 | 8/2005 | Proctor, Jr. | |
| 6,940,384 B2 | 9/2005 | Hooey et al. | |
| 6,954,641 B2 | 10/2005 | McKenna et al. | |
| 6,957,067 B1 | 10/2005 | Iyer et al. | |
| 6,990,428 B1 | 1/2006 | Kaiser et al. | |
| 7,002,943 B2 | 2/2006 | Bhagwat et al. | |
| 7,013,138 B2 * | 3/2006 | Mahany | 370/338 |
| 7,025,209 B2 | 4/2006 | Hawkins | |
| 7,068,644 B1 | 6/2006 | McConnell et al. | |
| 7,085,576 B2 | 8/2006 | Ranganathan | |
| 7,099,669 B2 | 8/2006 | Sheffield | |
| 7,127,258 B2 * | 10/2006 | Zegelin | 455/456.1 |
| 7,133,909 B2 | 11/2006 | Bahl | |
| 7,161,914 B2 | 1/2007 | Shoalb et al. | |
| 7,164,663 B2 | 1/2007 | Frank et al. | |
| 7,167,715 B2 * | 1/2007 | Stanforth | 455/457 |
| 7,203,751 B2 * | 4/2007 | Yasushi et al. | 709/225 |
| 7,212,837 B1 | 5/2007 | Calhoun et al. | |
| 7,269,151 B2 | 9/2007 | Diener et al. | |
| 7,277,416 B1 | 10/2007 | Chang et al. | |
| 7,286,833 B2 * | 10/2007 | Friday et al. | 455/456.1 |
| 7,301,926 B1 * | 11/2007 | Dietrich et al. | 370/338 |
| 7,313,113 B1 | 12/2007 | Hills et al. | |
| 7,340,247 B1 * | 3/2008 | O'Hara et al. | 455/418 |
| 7,366,524 B2 | 4/2008 | Watanabe et al. | |
| 7,596,376 B2 * | 9/2009 | Calhoun et al. | 455/436 |
| 7,702,333 B2 * | 4/2010 | Walker et al. | 455/434 |
| 2002/0046258 A1 * | 4/2002 | Yasushi et al. | 709/218 |
| 2002/0107017 A1 | 8/2002 | Song | |
| 2002/0168958 A1 | 11/2002 | Ford et al. | |
| 2002/0174335 A1 | 11/2002 | Zhang et al. | |
| 2002/0188723 A1 | 12/2002 | Choi | |
| 2002/0193116 A1 | 12/2002 | Agrawal et al. | |
| 2002/0194384 A1 | 12/2002 | Habetha | |
| 2003/0022686 A1 | 1/2003 | Soomro et al. | |
| 2003/0023746 A1 | 1/2003 | Loguinov | |
| 2003/0033423 A1 | 2/2003 | Okabe et al. | |
| 2003/0117985 A1 | 6/2003 | Fuji et al. | |
| 2003/0134642 A1 | 7/2003 | Kostic et al. | |
| 2003/0135762 A1 | 7/2003 | Macaulay | |
| 2003/0139197 A1 | 7/2003 | Kostic et al. | |
| 2003/0181215 A1 | 9/2003 | Cromer et al. | |
| 2003/0188006 A1 | 10/2003 | Bard | |
| 2003/0198208 A1 | 10/2003 | Koos, Jr. et al. | |
| 2003/0219008 A1 | 11/2003 | Hrastar | |
| 2003/0224787 A1 | 12/2003 | Gandolfo | |
| 2004/0003285 A1 | 1/2004 | Whelan et al. | |
| 2004/0008652 A1 | 1/2004 | Tanzella et al. | |
| 2004/0022222 A1 | 2/2004 | Clisham | |
| 2004/0023640 A1 | 2/2004 | Ballai | |
| 2004/0047324 A1 | 3/2004 | Diener | |
| 2004/0049699 A1 | 3/2004 | Griffith et al. | |
| 2004/0052232 A1 * | 3/2004 | Ramaswamy et al. | 370/338 |
| 2004/0076134 A1 | 4/2004 | Barber et al. | |
| 2004/0077341 A1 | 4/2004 | Chandranmenon et al. | |
| 2004/0103194 A1 | 5/2004 | Islam et al. | |
| 2004/0111607 A1 | 6/2004 | Yallepeddy | |
| 2004/0176108 A1 | 9/2004 | Misikangas | |
| 2004/0198220 A1 | 10/2004 | Whelan et al. | |
| 2004/0203779 A1 * | 10/2004 | Gabara | 455/436 |
| 2004/0203873 A1 * | 10/2004 | Gray | 455/456.1 |
| 2004/0203910 A1 | 10/2004 | Hind et al. | |
| 2005/0030929 A1 | 2/2005 | Swier et al. | |
| 2005/0030945 A1 | 2/2005 | Sarikaya et al. | |
| 2005/0060319 A1 | 3/2005 | Douglas et al. | |
| 2005/0073979 A1 | 4/2005 | Barber et al. | |
| 2005/0114649 A1 | 5/2005 | Challener | |
| 2005/0137790 A1 * | 6/2005 | Yamada et al. | 701/202 |
| 2005/0171720 A1 * | 8/2005 | Olson et al. | 702/121 |
| 2005/0207381 A1 | 9/2005 | Aljadeff et al. | |
| 2006/0187873 A1 | 8/2006 | Friday et al. | |
| 2006/0187878 A1 | 8/2006 | Calhoun et al. | |
| 2007/0232307 A1 | 10/2007 | Ibrahim et al. | |
| 2007/0280152 A1 | 12/2007 | Thomson et al. | |
| 2008/0062942 A1 | 3/2008 | Hills et al. | |

FOREIGN PATENT DOCUMENTS

| | | |
|---|---|---|
| EP | 0 967 816 | 12/1999 |
| EP | 1 018 457 | 7/2000 |
| EP | 1 296 531 | 3/2003 |
| EP | 1 301 055 | 4/2003 |
| JP | 02044929 | 2/1990 |
| JP | 2004340864 A * | 12/2004 |
| WO | WO 98/41048 | 12/1999 |
| WO | WO 99/08909 | 7/2000 |
| WO | WO 97/33386 | 10/2000 |
| WO | WO 02/43425 | 5/2002 |
| WO | WO 02/054813 | 7/2002 |
| WO | WO 03/023443 | 3/2003 |

OTHER PUBLICATIONS

Fanny Mlinarksy, Metrics and Methods Bring VoWLAN Success, wsdmag.com, Mar. 2005, http://www.wsdmag.com/Articles/Print.cfm?ArticleID=10003.

Rob Tillotson, CoPilot Live GPS Navigation System, Gadgeteer Hands On Review, The Gadgeteer, Apr. 12, 2006.

International Standard, ISO/IEC 8802-11 ANSI/IEEE std. 802.11, 1999 Edition, Part II: Wireless LAN medium Access Control (MAC) and Physical Layer (PHY) specifications, pp. 122-137.

"tcp-masq" Internet citation http://speed.cis.nctu.edu.tw/bandwith/opensource/. Daa Sheet Cisco Aironet 1200 Series Access Point, pp. 1-13, posted Mar. 11, 2002.

Chirumamilla, Mohan K. and Ramamurthy, Byrav, "Agent Based Intrusion Detection and Response System for Wireless LANs" IEEE Int'l conference on Communications, 2003, vol. 1, pp. 492-495.

"IBM Research Demonstrates Industry's First Auditig Tool for Wireless Network Security" Jul. 12, 2001, Hawthorne, N.Y. IBM Research News, 'Online, URL: http://domino.research.ibm.com/comm/re.nsf/pages/news.20010712_wireless.html.

"IBM Researchers Demonstrate Industry's First Self-Diagnostic Wireless Security Monitoring Tool" Jun. 21, 2002, Hawthonre NY IBM NIEUWS, 'Online! URL: http://domino.research.ibm.com/comm/re.nsf/pages/news.20020617_dwsa.html.

"Ekahau Logical Areas-location enabling the Wi-Fi network", Apr. 4, 2003, Ekahau, Inc., Saratoga, CA. Company's URL: www.ekahau.com.

"Ekahau Positioning Engine 2.0: Product Overview", Apr. 4, 2003, Ekahau, Inc., Saratoga, CA. Company's URL: www.ekahau.com/positioningengine/.

"Ekahau Positioning Engine 2.0: Data Sheet", Apr. 4, 2003, Ekahau, Inc., Saratoga, CA. URL: www.ekahau.com/pdf/EPE_2.0_datasheet.PDF.

"Indoor Positioning in 802.11b Networks," Apr. 4, 2003, Ekahau, Inc., Saratoga, CA. URL: www.ekahau.com/products/positioningengine.html.

"InFielder" Apr. 22, 2003. Wireless Valley, Austin, Texas URL: http://www.wirelessvalley.com/Products/InFielder/InFielder.asp.

"LANFielder", Apr. 22, 2003 Wireless Valley, Austin, Texas URL: http://www.wirelessvalley.com/Products/LANFielder/LANFielder.asp.

"Optimatic", Apr. 22, 2003 Wireless Valley, Austin, Texas URL: http://www.wirelessvalley.com/Products/Optimatic/Optimatic.asp.

"Predictor", Apr. 22, 2003 Wireless Valley, Austin, Texas URL: http://www.wirelessvalley.com/Products/Predictor/Predictor.asp.

"LANFielder Product Literature", Feb. 10, 2004, Wireless Valley, austin, Texas, URL: http://www.wirelessvalley.com/Assets/brochures/LanFielder.pdf.

Conley, C., "Securing WLANS with Location-Enabled Networks" Wireless Security Perspectives, vol. 5, No. 3, Mar. 2003, Organization's URL: www/cnp-wireless.com/wsp.html.

"Company Information" Apr. 6, 2004 Corsair Communications: A LightBridge Company, Burlington, MA. Company's URL: www.lightbridge.com.

"Corporate Fact Sheet" Aruba Wireless Networks, San Jose, CA Feb. 10, 2004. URL: http://www.arubanetworks.com/pdf/corporate_fact_sheet.pdf.

Geier, J. "Identifying Rogue Access Points", Jan. 6, 2003. Wi-Fi Planet Tutorials. URL: http://www.wi-fiplanet.com/tutorials/article/php/1564431.

Brewin, B. "IBM Develops Tool to Detect Rogue Wireless LAN Access Points" Jun. 17, 2002, Computerworld, Framington, MA. URL: http://www.computerworld.com/mobiletopics/mobile/story/0,10801,72065.00 html.

Bulusu, N., Heldermann, J., Estrin, D. "GPS-less Low Cost Outdoor Localization for Very Small Devices," *IEEE Personal Communications*, Oct. 2000 URL: http://lecs.cs.ucla.edu/-bulusu/papers/Bulusu00a.pdf.

"Accessing Wireless Security with AiroPeek and AiroPeek NX," A WildPackets Academy Tutorial from www.wildpackets.com, WildPackets Inc., Walnut Creek, CA, Jan. 16, 2003 URL: http://www.wildpackets.com/elements/whitepapers/RogueAccess Points.pdf.

"AiroPeek and Wireless Security: Identifying and Locating Rogue Access Points", A WildPackets Academy Tutorial from www.wildpackets.com, WildPackets Inc., Walnut Creek, CA, Jan. 16, 2003 URL: http://www.wildpackets.com/elements/whitepapers/RogueAccess Points.pdf.

Craiger, J.P. "802.11, 802.1x and Wireless Security," Jun. 23, 2002. From the SANS' Information Security Reading Room on www.sans.org, The SANS Institute, Bethesda, MD URL: http://www.sans.org.rr/papers/68171.pdf.

Baily, S. "Is IEEE 802.1x Ready for General Deployment?" Apr. 7, 2002, From the SANS' Information Security Reading Room on www.sans.org, The SANS Institute, Bethesda, MD URL: http://www.sans.org.rr/papers/9/709.pdf.

"Airwave Rogue Access Point Detection", 2002 Airwave Wireless, Inc. San Mateo, CA. URL: http://airwave.com/features.html, 2002.

PCT Notification of Transmittal of the International Search Report and the Written Opinion of the International Searching authority or the Declaration (PCT Rule 44.1), dated Sep. 18, 2006, International Application No. PCT/US2006/00078.

USPTO, Office Action for U.S. Appl. No. 11/182,264, filed Jul. 15, 2005 in the name of Robert J. Friday, (CPOL 619295) 22 pages, Dec. 10, 2008.

IEEE Standards 802.11F IEEE *Trial-Use Recommended Practice for Multi-Vendor Access Point Interoperability via an Inter-Access Point Protocol Acrodd Distribution Systems Supporting IEEE 802.11 Operation*, IEEE Computer Society, The Institute of Electrical and Electronics Engineers, Inc., Jul. 14, 2003.

Office action for CN 200780009822.4, Mar. 30, 2010.

* cited by examiner

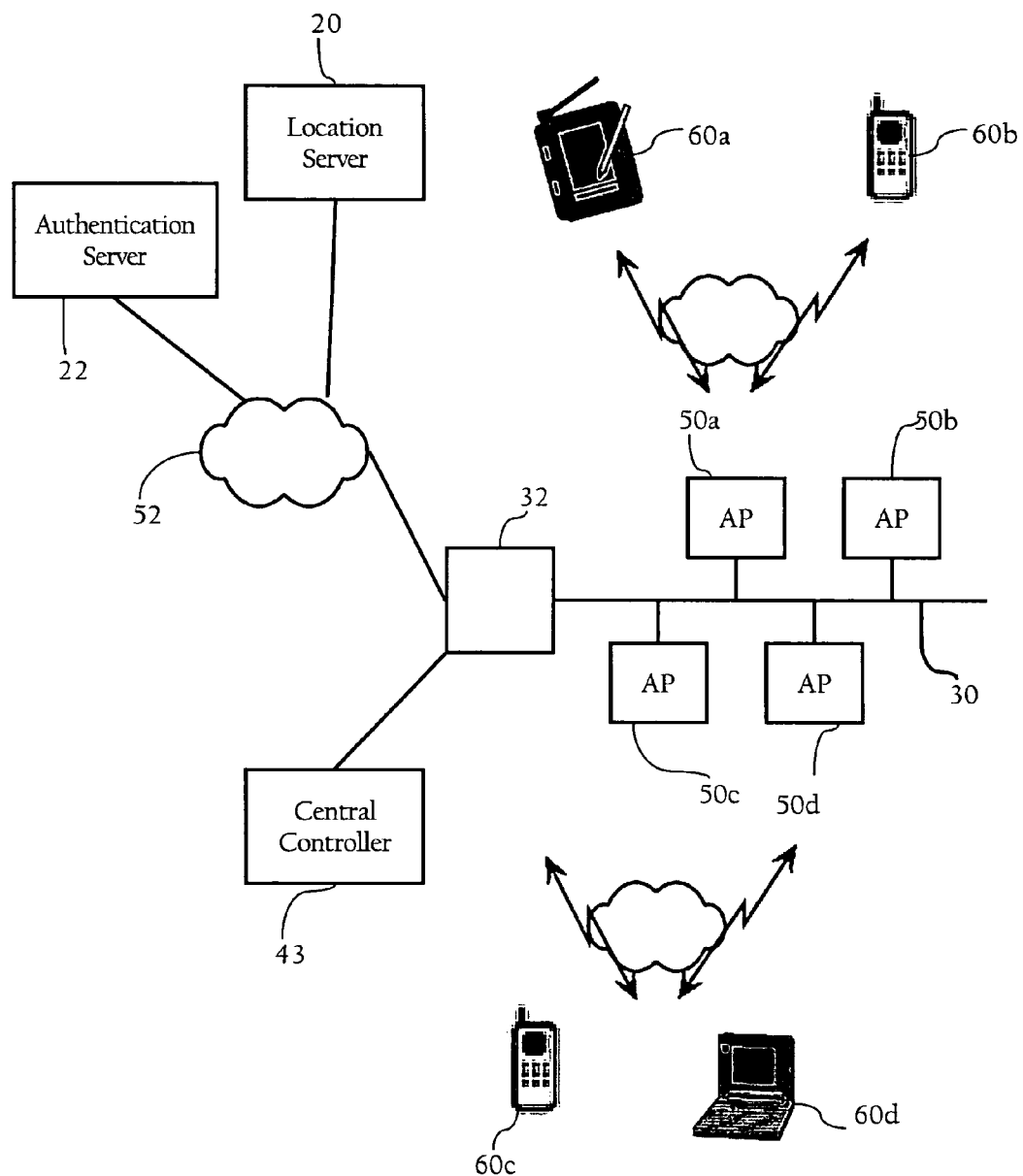
Fig._1A

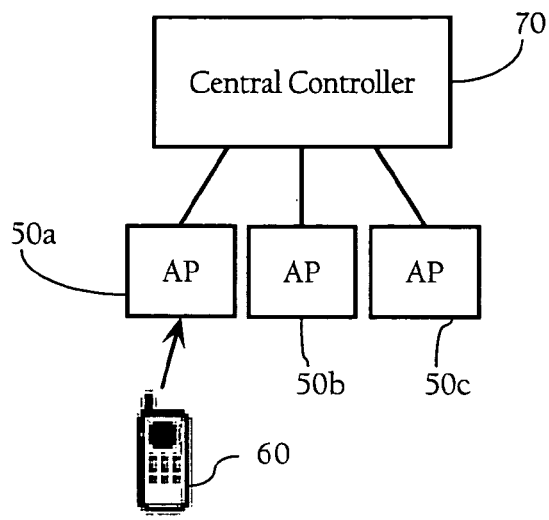
Fig._1B
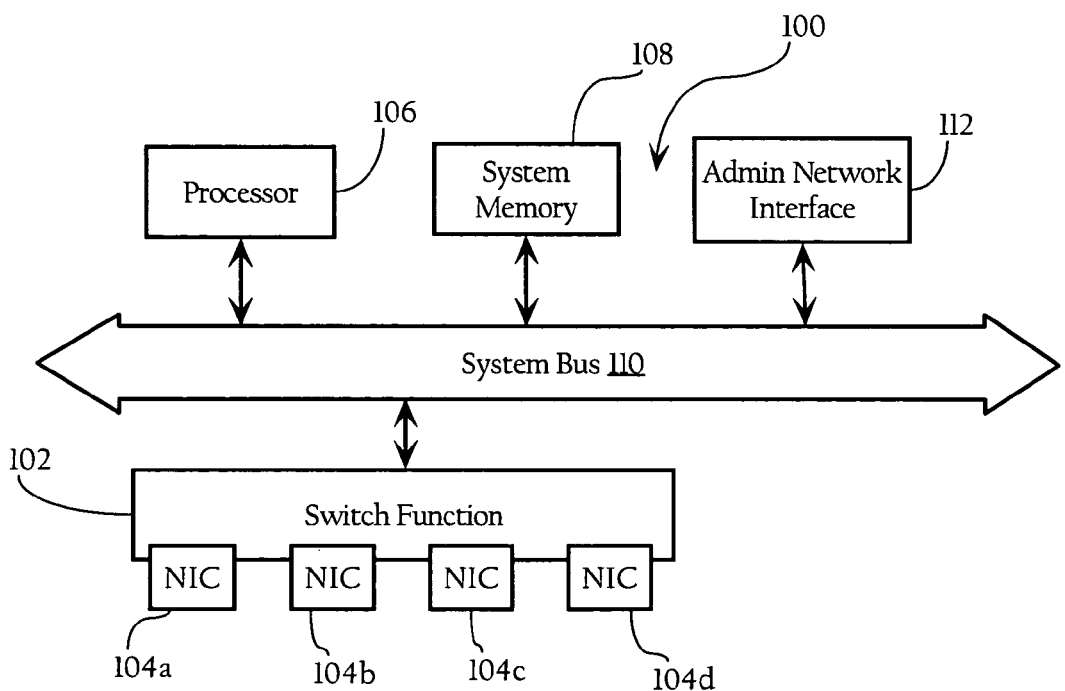
Fig._1C

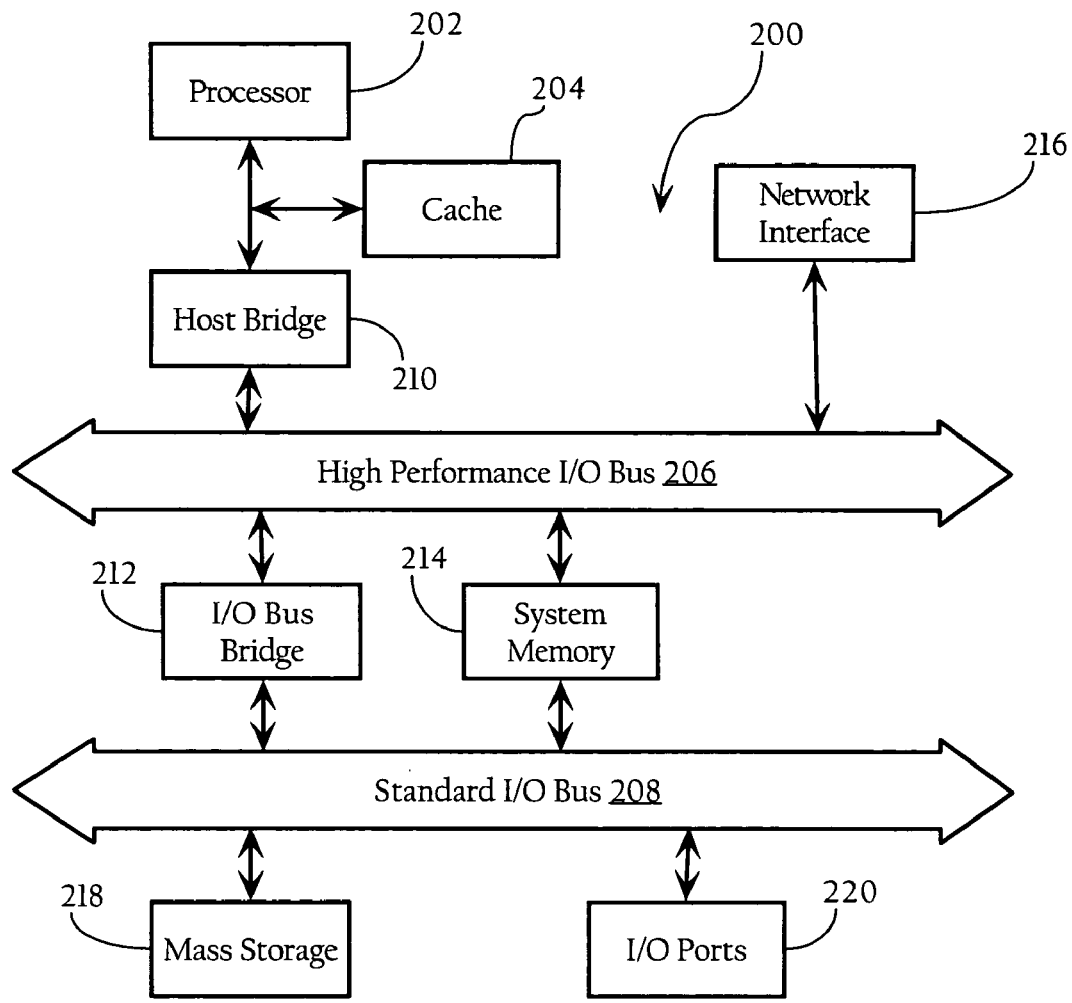
Fig._2

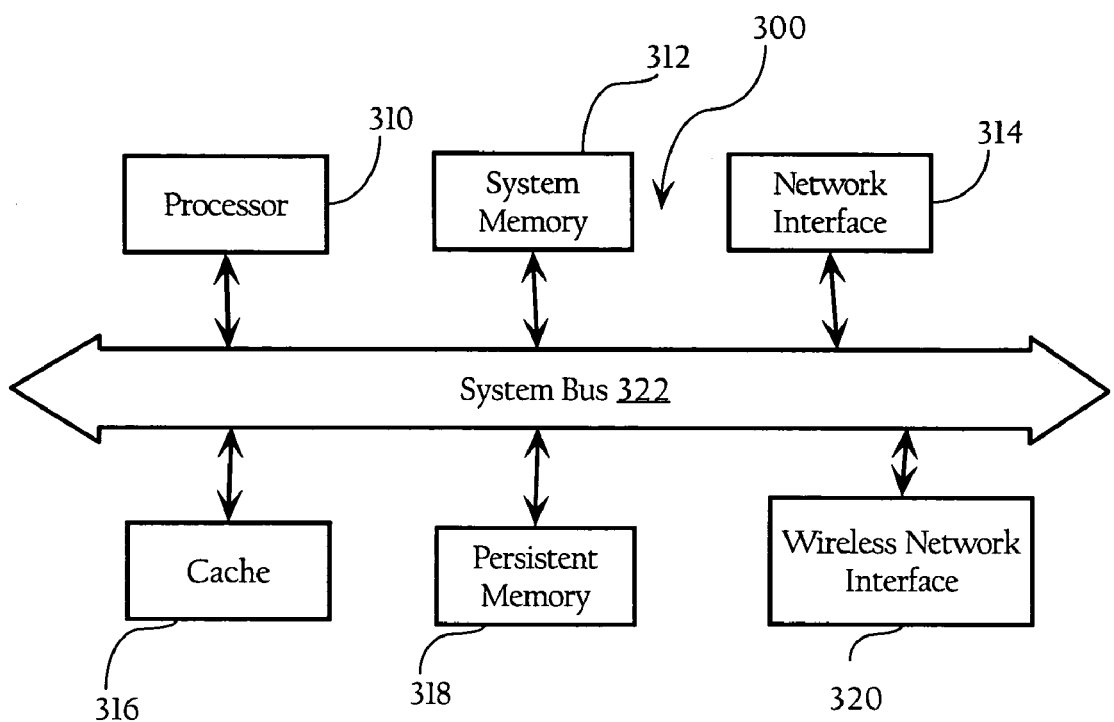
Fig._3

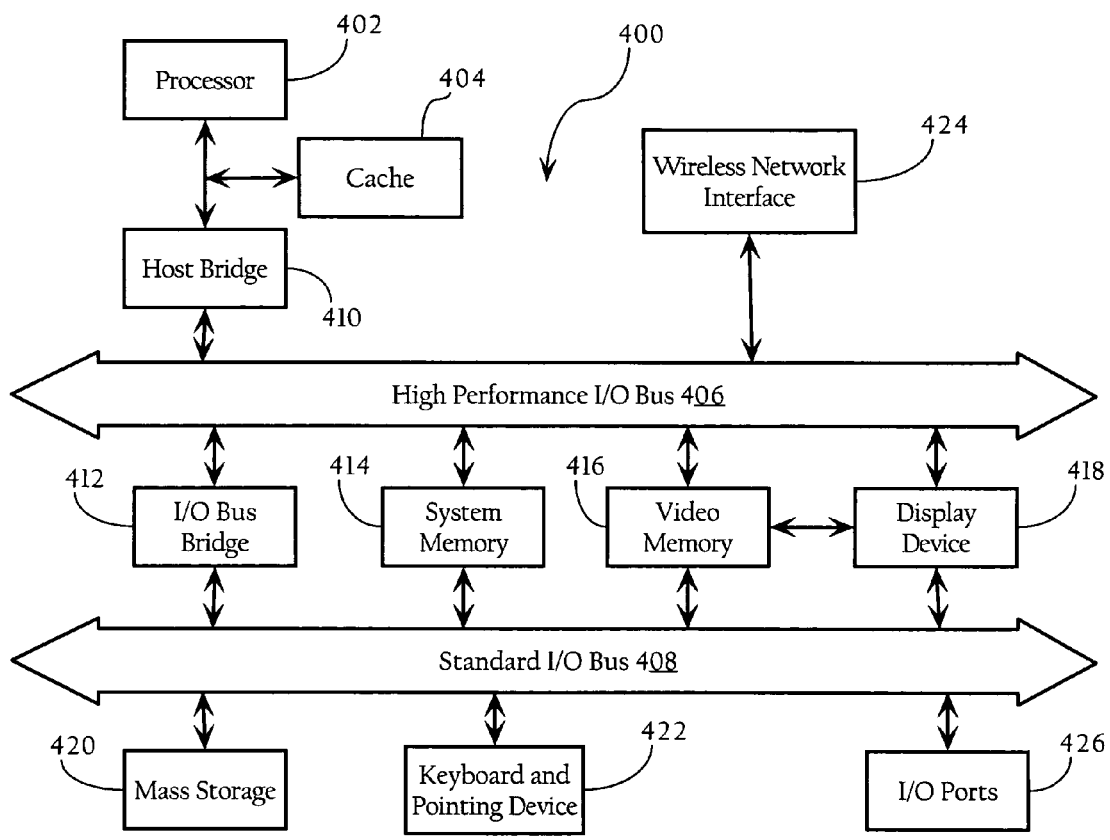
Fig._4

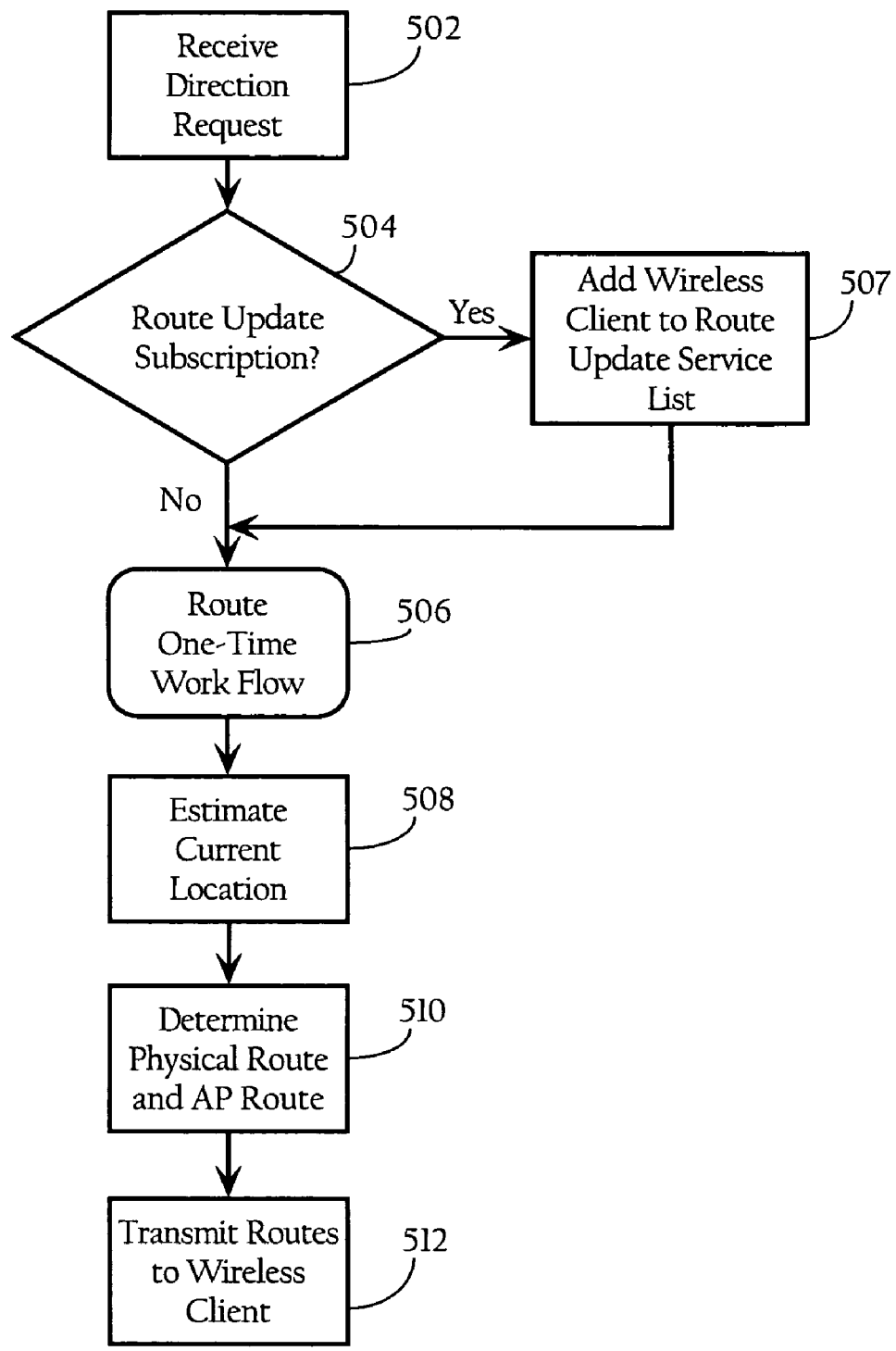
Fig._5A

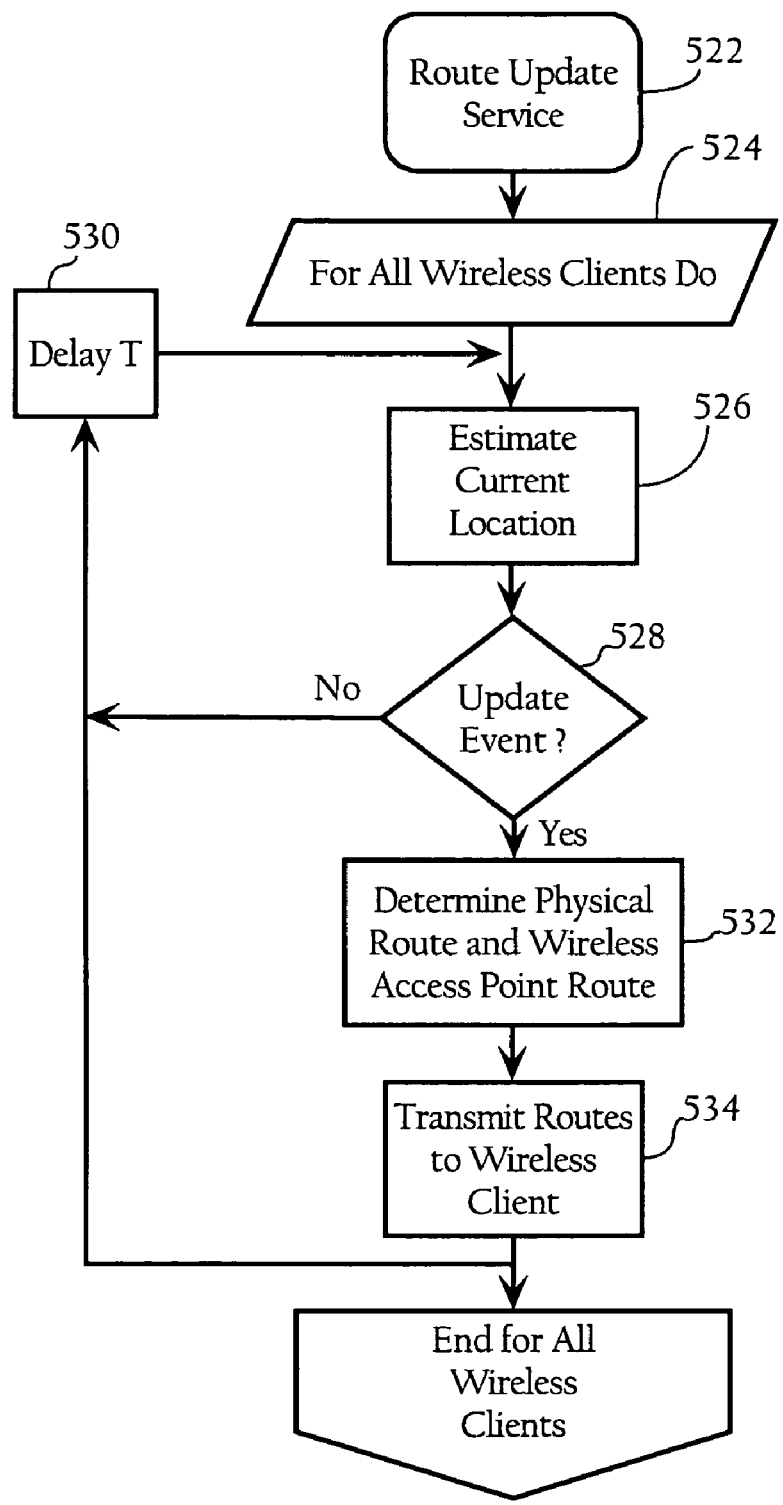
Fig._5B

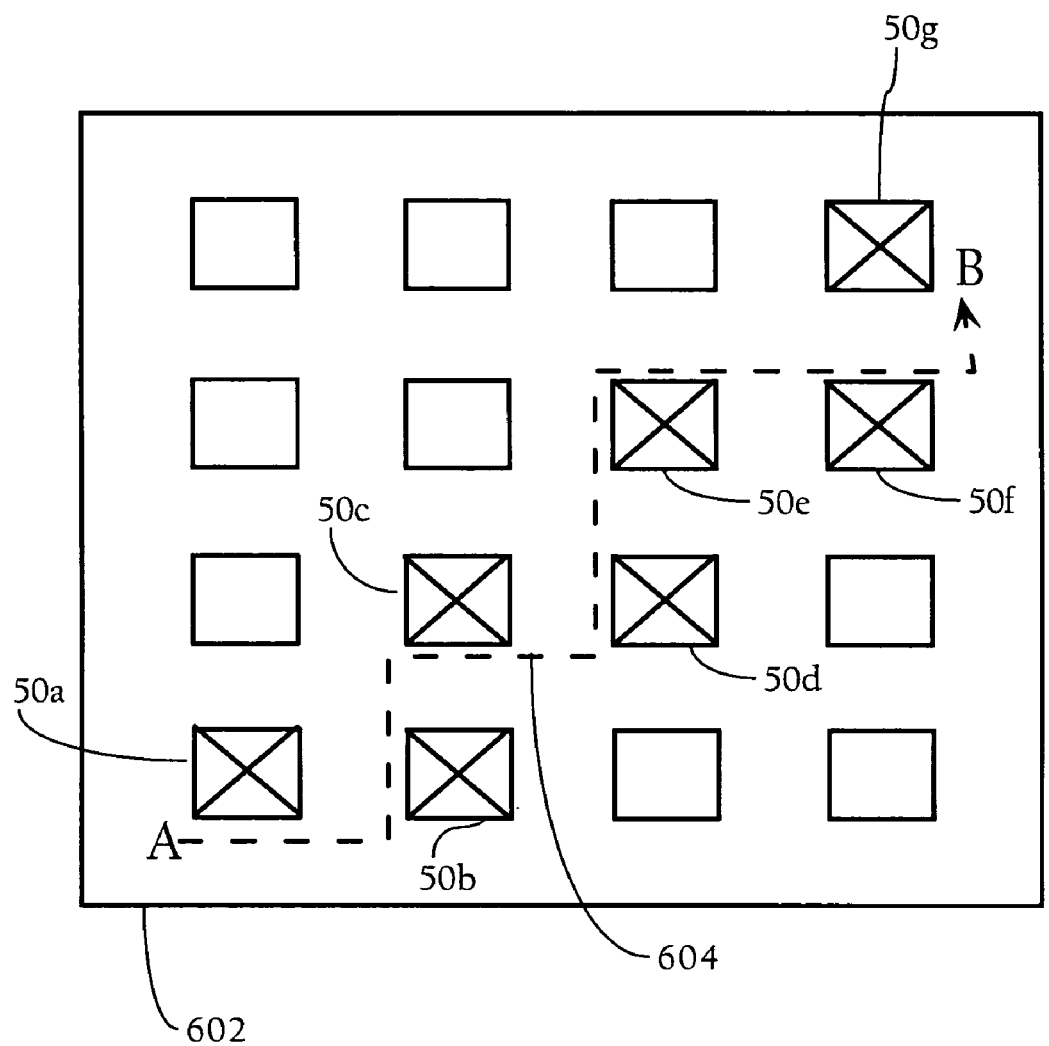
Fig._6

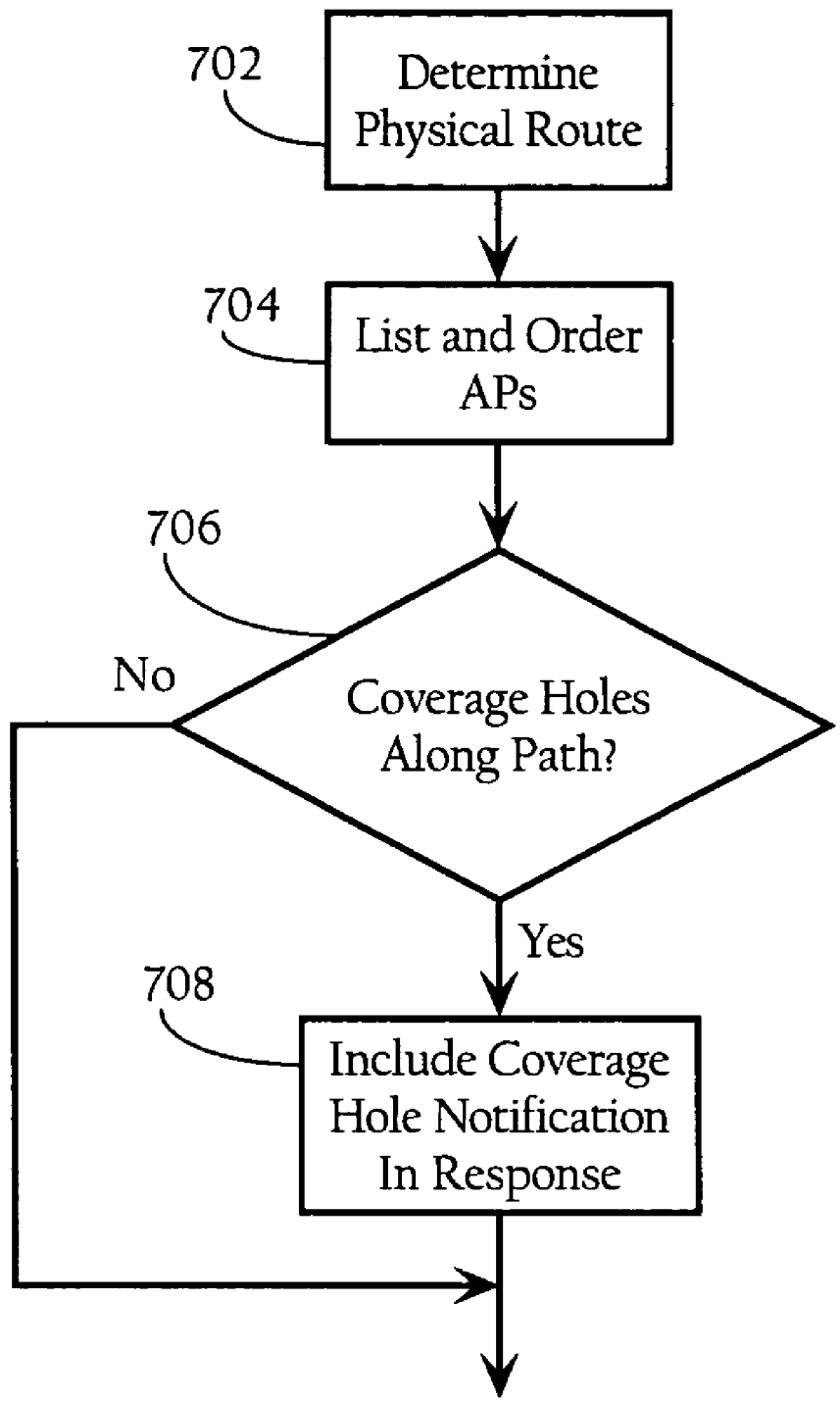
Fig._7

WLAN INFRASTRUCTURE PROVIDED DIRECTIONS AND ROAMING

FIELD OF THE INVENTION

The present invention relates to wireless networks and, more particularly, to methods, apparatuses, and systems directed to providing directions and facilitating roaming in a wireless network.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Various geolocation technologies may provide physical directions to a destination based on a current location. Such directions are typically provided using tools such as global positioning system technology, for example. However, technologies that provide directions are limited in that existing technologies do not address roaming issues such as coverage holes and service disruption and GPS technology has problems operating in indoor environments, because building structures such as walls and ceilings interfere with signals between GPS receivers and satellites.

DESCRIPTION OF THE DRAWINGS

FIG. 1A is a topological diagram of the components in a wireless local area network (WLAN) system according to one implementation of the present invention.

FIG. 1B illustrates a hierarchical wireless network including a central controller, according to one implementation of the present invention.

FIG. 1C illustrates for didactic purposes a hardware system, which may be used to implement a central controller.

FIG. 2 illustrates for didactic purposes a hardware system, which may be used to implement a location server or a location server.

FIG. 3 illustrates for didactic purposes a hardware system, which may be used to implement a wireless access point.

FIG. 4 illustrates for didactic purposes a hardware system, which may be used to implement a wireless client.

FIG. 5A is a flow chart illustrating a process flow, according to one implementation of the present invention, implemented at a location server.

FIG. 5B is a flow chart illustrating a process flow, according to another implementation of the present invention, implemented at a location server.

FIG. 6 is a diagram of a floor plan showing routes, according to one implementation of the present invention.

FIG. 7 is a flow chart illustrating a process flow, according to one implementation of the present invention, implemented at a location server.

DESCRIPTION OF EXEMPLARY EMBODIMENTS

A. Overview

Particular embodiments of the present invention provide to wireless clients physical directions to a location and information facilitating roaming operations. According to one implementation of the present invention, the wireless network infrastructure generates and transmits directions to a location, where the directions include a physical route and a wireless access point route. As described in more detail below, in one implementation, the wireless network infrastructure receives a direction request (which includes a destination) from the wireless client, estimates a current location of the wireless client, and then determines a physical route and a wireless access point route based on the current location and the destination (i.e., a particular office or conference room on a particular floor or in a particular building). In one implementation, the wireless network infrastructure may provide a one-time route work flow or a route update service that provides updated directions as the user travels in the physical environment. In one implementation, the wireless network driver of the wireless client can be configured to interact with the wireless network infrastructure and provide the physical and wireless access point routes to a wireless client application, which may present the routes to a user to provide directions and to facilitate roaming. In one implementation, the driver of the wireless client may further facilitate roaming by using the route information to selectively associate with identified wireless access points and, optionally, to pre-allocate wireless network resources along the physical and wireless access point routes.

B. Exemplary Wireless Network System Architecture

B.1. Network Topology

A network environment including a wireless local area network (WLAN) according to one implementation of the present invention is shown in FIG. 1A. In a specific embodiment of the present invention, the system includes a location server 20, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between location server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points. Of course, configuration and management information can be obtained in a variety of manners without departing from the scope of the present invention.

B.2. Central Controller

FIG. 1B illustrates a hierarchical wireless network including a central controller 70, which may be used to implement the central controller 43 of FIG. 1 according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented with a wireless switch, the central controller 70 is operative to communicate with light-weight wireless access points.

FIG. 1C illustrates, for didactic purposes, a hardware system 100, which may be used to implement a central controller 70 of FIG. 1B. As FIG. 1C shows, in one implementation, the central control elements each comprise a switch function or fabric 102 comprising a network interface 104a (e.g., a Ethernet adapter) for connection to network 52 and corresponding network interfaces 104b, 104c, and 104d. This switch function or fabric 102 is implemented to facilitate connection to the access elements, a processor 106, a memory 108, one or more software modules, stored in memory 108, including instructions for performing the functions described herein, and a system bus 110 operably connecting these components. The central control elements may optionally include an administrative network interface 112 allowing for administrative access for such purposes as configuration and diagnostic access.

B.2. Location Server

FIG. 2 illustrates for didactic purposes a hardware system 200, which may be used to implement location server 20 of FIG. 1A. The location server 20 is operative to compute the location of wireless clients based on wireless signal measurements, such as signal strength measurements, time of arrival measurements, time difference arrival measurements and the like. In one implementation, the signal measurements detected by wireless access points are collected by the wireless network infrastructure and used to compute the location of the wireless clients. The location server 20 further has access to maps and wireless access point location information to allow it to compute physical and access point routes for requesting wireless clients.

In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the location server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.3. Wireless Access Point

FIG. 3 illustrates for didactic purposes a hardware system 300, which may be used to implement a wireless access point 50 of FIG. 1A. In one implementation, the wireless access point 300 comprises a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, etc.). At start up, these software components are loaded into system memory 312 and then accessed and executed by processor 310.

B.4. Wireless Client

FIG. 4 illustrates for didactic purposes a hardware system 400, which may be used to implement a wireless client 60 of FIG. 1A. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 400 are described in greater detail below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in discrete hardware or firmware.

While FIG. 4 illustrates, for didactic purposes, the hardware architecture of a wireless client according to one implementation of the present invention, the present invention, however, may be implemented on a wide variety of computer system architectures, such as dual-mode cellular phones (e.g., cellular plus 802.11 capable devices), wireless VoIP phones, Personal Digital Assistants (e.g., converged devices which support WLAN data+voice and cellular), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, Symbian operating systems, and the like.

C. Physical and Wireless Access Point Routes

As describe above, in one implementation, the wireless network infrastructure generates and transmits directions to a wireless client, where the directions include both a physical route and a wireless access point route. As described below in connection with FIG. 5, the location server 20 computes the physical route and the wireless access point route based on a current location that location server 20 estimates and based on a destination that the wireless client 60 provides in a direction request. In one implementation, the location server 20 may provide the directions in a one-time route work flow or as a part of a route update service, both of which are described below in connection with FIG. 5.

In one implementation, a wireless client 60 transmits a direction request to the location server 20 via the wireless network (e.g., via a wireless access point 50 and a central controller 70). In one implementation, wireless client 60 sends the direction request in a unicast wireless management frame to wireless access point 50 to which wireless client 60 is currently associated. The wireless access point 50 and/or the central controller 70 can be configured to recognize the direction request and forward it to the location server 20. In another implementation, the wireless network can advertise the network address of location server 20 in wireless management frames, such as beacon frames. In such an implementation, wireless client 60 may transmit a direction request to the location server 20 using this network address. Accordingly, the direction request can be a link layer or network layer message transmitted to a corresponding node in, or supporting, the wireless network infrastructure. In addition, the direction request and response can be integrated into WLAN protocols. For example, the direction request can be appended as an information element to an authentication or association (or other wireless management frame). In one implementation, the direction request includes a physical reference to a destination, and requests the wireless network infrastructure to provide path information to that destination. In one implementation, the physical reference may be defined in an XML format as defined by the Internet Engineering Task Force (IETF) Geopriv working group, for example. The specific protocol that the wireless client uses to transmit the direction request may vary depending on the specific implementation. Exemplary protocols may include Inter-Access Point Protocol (IAPP) and Cisco Compatible Extensions (CCX) Protocol. Wireless access point 50 then forwards the direction request to central controller 70. In one implementation, central controller 70 may apply a security policy to allow or drop the direction request. For example, in one implementation, central controller 70 may verify the security credentials of wireless client 60 and/or determine whether wireless client 60 is blacklisted.

As indicated above, in one implementation, the wireless client may provide a destination in the destination request. Alternatively, in another implementation, central controller 70 may access a cache of local destinations to determine whether the destination of the wireless client is already stored. In one implementation, the destination may include a building number (e.g., Building 15), a floor number (e.g., 3th floor), an X-Y coordinate relative to a given point (e.g., X=100 feet, Y=175 feet), the destination wireless access point to which the wireless client will connected, etc. If so, central controller 70 includes the destination in the destination request to be sent to location server 20 for route computations. In one implementation, if central controller 70 has not found the destination in the local cache, central controller 70 includes information in the destination request, which may be used to compute routes. Such information may include, for example, the original destination XML of the wireless client, the MAC address of the wireless client, and/or a set of RSSI signal measurements for the wireless client. A variety of caching algorithms can be used to clear expired or older entries from the cache. In some implementations, the central controller 70 may also append the current location of the wireless client. For example, if the wireless client is associated with an access point known to be at an ingress/egress point of a building, the central controller 70 can append or include a current location corresponding to the ingress/egress point to the direction request.

As described in more detail below, in one implementation, in response to the direction request, location server 20 provides direction information to wireless client 60 based on the current location and destination. In one implementation, the direction information may include a current location, a physical route, and a wireless access point route.

FIG. 5A is a flow chart illustrating a process flow, according to one implementation of the present invention, implemented at a location server 20. As FIG. 5 shows, after location server 20 receives a direction request (502), the location server 20 determines whether the direction request includes a subscription to a route update service (504). If not, location server 20 performs a one-time route work flow (506). If the wireless client subscribes to a route update service, the location server adds the wireless client to a route update service (507) and then performs the one-time route work flow (506).

C.1. One-Time Route Work Flow

As FIG. 5A illustrates, the location server estimates the current location of wireless client 60 (508). In one implementation, the current location may include a building number (e.g., Building 14), a floor number (e.g., 4th floor), an X-Y coordinate relative to a given point (e.g., X=200 feet, Y=150 feet), the current wireless access point the wireless client is connected to, etc. In one implementation, central controller 70 gathers location-related data for the wireless client, such as signal strength or other information detected by one or more wireless access points, and transmits the location-related data to the location server 20, which then computes the current location of wireless client 60. In one implementation, central controller 70 requests the location data from wireless client 60. For example, the location data may include the signal strength, observed by the wireless client, of transmissions by one or more wireless access points 50 of the wireless network infrastructure. In another implementation, the location data may include signal information (e.g., signal strength of the client as measured by the infrastructure) obtained by one or more wireless access points 50 of the wireless network infrastructure. In some implementations, central controller 70 (or some other element of the wireless network infrastructure) may direct the wireless client to transmit a series of frames on one or more selected operating channels to allow one or more wireless access points 50 of the wireless network infrastructure to detect the signal of the wireless client. In one implementation, the location data may include measurement information such as received signal strength information or other location measurement information (e.g., Time of Arrival (TOA) or Time Difference of Arrival (TDOA) information). As discussed above, the location-related data may be based on the access point to which the wireless client is associated. Central controller 70 then forwards the collected location data to the location server.

After location server 20 estimates the current location of wireless client 60 (or uses a current location identified in the direction request), location server 20 determines a physical route (based on the current location the destination) and determines a wireless access point route based on the physical route (510). The determination of the physical and wireless access point routes is described below in connection with FIGS. 6 and 7. Location server 20 then transmits the physical and wireless access point routes to wireless client 60 (512).

C.2. Route Update Service

FIG. 5B is a flow chart illustrating a process flow, according to another implementation of the present invention, implemented at a location server. As describe above, after location server 20 receives the direction request (502), if wireless client 60 has requested a route update subscription (504), location server 20 adds the wireless client 60 to a route update service list (507) (in one implementation, setting a timer or generating a time stamp that may be used in the route update service process). As FIG. 5B shows, for each wireless client on the route update service list (524), location server 20 estimates the current location (526). In one implementation, the current location may include a building number (e.g., Building 14), a floor number (e.g., 4th floor), an X-Y coordinate relative to a given point (e.g., X=200 feet, Y=150 feet), the current wireless access point the wireless client is connected to, etc. Location server 20 then determines whether an update event has occurred (528). In one implementation, an update event may be the occurrence of a threshold time period and/or a minimum distance traveled. In one implementation, for update route workflows, the threshold time period may be every T seconds (e.g., every 10 seconds), and the minimum distance traveled may be every X meters (e.g., every 2 meters). If no update event has occurred, location server 20 waits for a preset time (Delay T) (530) before estimating the current location of a given wireless client again. Accordingly, location server 20 periodically updates the current location of each wireless client based on update events. If an update event has occurred, location server 20 determines a physical route based on the current location and destination and determines a wireless access point route based on the physical route (532). Accordingly, as wireless client 60 progresses towards (or away from) the destination, location server 20 provides updated location and route information to wireless client 60. In one implementation, location server 20 may provide specific roaming instructions (e.g., "move towards the left side of the floor by 190 feet for 5 minutes, enter the stairs, and then go down to the second floor," etc.). The determination of the physical and wireless access point routes is described below in connection with FIGS. 6 and 7. Location server 20 then transmits the physical and wireless access point routes to the wireless client (534) and waits for the preset time (Delay T) before estimating the current location of the wireless client again (526).

As a result of the workflow described above, the location server 20 tracks the location of the wireless client and provides a new current location, physical route, and wireless access point route periodically and/or after the wireless client changes location on route to the destination.

In one implementation, location server 20 may remove a given wireless client from the update service list upon an explicit command from the wireless client or upon detection of a particular condition such as when the wireless client reaches the destination (e.g., current location=destination) or if the wireless client is undetected after a particular time period.

D. Computation of the Wireless Access Point Route

FIG. 6 is a diagram of a floor plan showing a physical route and a wireless access point route, according to one implementation of the present invention. As FIG. 6 illustrates, wireless access points (indicated by boxes) are deployed on a floor 602 of a building. In one implementation, the wireless network infrastructure provides a physical route 604 from a current location "A" to a destination "B." The wireless network infrastructure also provides a wireless access point route (indicated by marked boxes and reference numbers 50*a*-50*g*).

In one implementation, the physical route may be a walk path and the wireless access point may be the set of nearby wireless access points that would maintain wireless connectivity along the physical route. In one implementation, the wireless access point route would be a set of MAC addresses that the wireless client would use to direct roaming. For example, if the destination "B" were requested, the location server 20 provides the wireless client with the physical route (i.e., walk path), wireless access point route, optional distances and time estimates, etc. As described above, in one implementation, the current location may include a building number (e.g., Building 14), a floor number (e.g., 4th floor), an X-Y coordinate relative to a given point (e.g., X=200 feet, Y=150 feet), the current wireless access point the wireless client is connected to, etc.

In one implementation, to help calculate the routes, location server 20 may be preconfigured with the physical layout of one or more physical regions (e.g., buildings, campuses, etc.). For example, physical obstructions (e.g., walls, windows, etc.), stairs, and elevators may be configured in the physical layout to allow the location server 20 to compute the physical routes to various destinations.

FIG. 7 is a flow chart illustrating a process flow, according to one implementation of the present invention, implemented at a location server to determine a physical route and a wireless access point route. Referring to both FIGS. 6 and 7, location server 20 determines the physical route (702). As described above, the physical route is based on the current location of the wireless client and the destination. As FIG. 7 shows, the physical route 604 provides a physical path from the current location A to the destination B, where the physical route 604 may vary depending on physical obstacles (e.g., walls) or other policy considerations (e.g., unauthorized zones). For ease of illustration, only one floor is shown in FIG. 7. In other implementations, the physical route may span multiple floors in multiple buildings.

In one implementation, location server 20 then lists and orders the wireless access points along the physical route 604 (e.g., wireless access points 50*a*, 50*b*, 50*c*, 50*d*, 50*e*, 50*f*, and 50*g*). In one implementation, the location server 20 may utilize an algorithm (e.g., a closest-to algorithm) to determine the wireless access points that are within maximum distance (or minimum signal strength coverage) from the physical route 604 using a radio-frequency coverage map or other suitable means. In one implementation, location server 20 lists the Media Access Control (MAC) address of the identified wireless access points, current RF channels of the wireless access points, etc. In one implementation, if more than one wireless access point is in close proximity to the physical route 604, location server 20 may choose one of the wireless access points. Alternatively, the location server may list all of the wireless access points and designate one wireless access point as a primary wireless access point and designate the others as alternatives.

In one implementation, after location server 20 computes the physical and wireless access point routes, location server 20 transmits a destination response to central controller 70 (or directly to the wireless client). In one implementation, location server 20 formats the destination response in a particular extensible mark-up language (XML) format if the wireless client requests the format. In one implementation, location server 20 may also provide annotated images (JPEG, GIF, etc.) with the directions. Central controller 70 then transmits a unicast response to the wireless client with the response content. In some implementations, the Inter Access Point Protocol (IAPP) and/or Cisco Compatible Extensions (CCX) protocol may be used. After wireless client 60 receives the destination response, wireless client 60 may then store the location and destination information (physical and wireless access point routes) in a manner accessible to a wireless client application of the wireless client that requested path information. In one implementation, the wireless client application may display the location and direction information to a user.

D.1. Coverage Policies

In one implementation, location server 20 may determine whether any coverage holes exist along the physical route. A coverage hole may be based on radio frequency (RF) attributes (e.g., signal strength). In one implementation, if any coverage holes exist, in one implementation, location server 20 may determine the physical and wireless access point routes accordingly to avoid known coverage holes and may include a coverage hole notification in the direction response provided to a given wireless client.

D.2. Security Policies

In some implementations, location server 20 may apply policy considerations when determining the physical route. For example, location server 20 may first determine the credentials of or black lists including a given wireless client and then determine the physical and wireless access point routes accordingly. If a wireless client is not authorized to enter one or more particular zones, location server 20 may compute the physical and wireless access point routes accordingly.

E. Pre-Allocation Policies

In one implementation, the driver of the wireless client may further facilitate roaming by using the route information to pre-allocate wireless network resources along the route. For example, as a wireless client roams, the wireless client may utilize the access point route information (physical and wireless access point routes) to reserve or "pre-allocate" resources (e.g., security and QoS resources) of one or more wireless access points in the wireless network. Pre-allocating resources optimizes transitions, as the receiving wireless access points already have resources reserved or pre-allocated for the wireless client before the wireless client arrives. Roaming standards such as IEEE 802.11k and 802.11r allow for a wireless client to acquire information about network capabilities through radio measurements, through potential roaming neighboring basic service set identifiers (BSSIDs), and ultimately through the pre-allocation of required services.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A non-transitory computer-readable medium comprising computer-readable instructions for obtaining route information, the computer-readable instructions when executed operable to cause a processor and a network interface to:

transmit a direction request identifying a destination in a physical region;

receive a direction response, wherein the direction response comprises physical route information and wireless access point route information to the destination, wherein the wireless access point route information identifies one or more wireless access points; and use the wireless access point route information in the direction response when roaming between wireless access points by pre-allocating resources of one or more wireless access points identified in the wireless access point route information prior to establishing a connection with the one or more wireless access points.

2. The non-transitory computer-readable medium of claim 1 wherein the direction request includes a direction update request.

3. The non-transitory computer-readable medium of claim 1 wherein the physical route information comprises a map of at least a portion of the physical region.

4. The non-transitory computer-readable medium of claim 1 wherein the computer readable instructions are further operable to cause the processor and the network interface to display the physical route information to a user.

5. The non-transitory computer-readable medium of claim 1 wherein the computer readable instructions are further operable to cause the processor and the network interface to receive direction updates.

6. The non-transitory computer-readable medium of claim 1 wherein the physical route information and the wireless access point route information are based at least in part on one or more of coverage hole policies and security policies.

7. A wireless client comprising:

one or more processors;

a memory;

a wireless network interface; and one or more modules, physically stored in the memory, comprising instructions operable to cause the one or more processors and the wireless client to:

transmit a direction request identifying a destination in a physical region; and receive a direction response, wherein the direction response comprises physical route information and a wireless access point route information to the destination, wherein the wireless access point route information identifies one or more wireless access points; and use the wireless access point route information in the direction response when roaming between wireless access points by pre-allocating resources of one or more wireless access points identified in the wireless access point route information prior to establishing a connection with the one or more wireless access points.

8. The wireless client of claim 7 wherein the direction request includes a direction update request.

9. The wireless client of claim 7 wherein the physical route information comprises a map of at least a portion of the physical region.

10. The wireless client of claim 7 wherein the one or more modules further comprises instructions operable to cause the one or more processors and the wireless client to display the physical route information to a user.

11. The wireless client of claim 7 wherein the one or more modules further comprises instructions operable to cause the one or more processors and the wireless client to receive direction updates.

12. The wireless client of claim 7 wherein the physical route information and the wireless access point route information are based at least in part on one or more of coverage hole policies and security policies.

13. A method for obtaining route information comprising:

transmitting a direction request identifying a destination in a physical region; and receiving a direction response, wherein the direction response comprises physical route information and a wireless access point route information to the destination, wherein the wireless access point route information identifies one or more wireless access points; and using the wireless access point route information in the direction response when roaming between wireless access points by pre-allocating resources of one or more wireless access points identified in the wireless access point route information prior to establishing a connection with the one or more wireless access points.

14. The method of claim 13 wherein the direction request includes a direction update request.

15. The method of claim 13 wherein the physical route information comprises a map of at least a portion of the physical region.

16. The method of claim 13 further comprising displaying the physical route information to a user.

17. The method of claim 13 further comprising receiving direction updates.

18. The method of claim 13 wherein the physical route information and the wireless access point route information are based at least in part on one or more of coverage hole policies and security policies.

19. Logic for providing route information, the logic encoded in one or more media for execution and when executed operable to:
   receive a direction request identifying a destination in a physical region;
   estimate a current location of a wireless client;
   determine credential and black list information associated with the wireless client;
   determine physical route information based on the current location, wherein if the wireless client is not authorized to enter one or more particular zones, determine physical route information based at least in part on the credential and black list information;
   determine a wireless access point route information to the destination based on the physical route information; and
   transmit a direction response, wherein the direction response comprises the physical route information and the wireless access point route information.

20. The logic of claim 19 wherein the logic is further operable to identify the wireless access points based on their proximity to the physical route.

21. The logic of claim 19 wherein the logic is further operable to determine whether a subscription exists.

22. The logic of claim 19 wherein the update event comprises one or more of a predetermined time period, a predetermined distance that the wireless client has traveled, and a network reconfiguration.

23. The logic of claim 19 wherein the logic is further operable to:
   determine coverage hole information; and
   include a coverage hole notification in the direction response.

24. The logic of claim 19 wherein the physical route information and the wireless access point route information are based at least in part on one or more of coverage hole policies and security policies.

25. An apparatus comprising:
   one or more processors;
   a memory;
   a network interface; and
   one or more modules, physically stored in the memory, comprising instructions operable to cause the one or more processors and the wireless network server to:
   receive a direction request identifying a destination in a physical region;
   estimate a current location of a wireless client;
   determine credential and black list information associated with the wireless client;
   determine physical route information based on the current location, wherein if the wireless client is not authorized to enter one or more particular zones, determine physical route information based at least in part on the credential and black list information;
   determine a wireless access point route information to the destination based on the physical route information; and
   transmit a direction response, wherein the direction response comprises the physical route information and the wireless access point route information.

26. The wireless network server of claim 25 wherein, to determine the wireless access point route information, one or more modules further comprises instructions operable to cause the one or more processors and the wireless network server to:
   identify the wireless access points based on their proximity to the physical route.

27. The wireless network server of claim 25 wherein the one or more modules further comprises instructions operable to cause the one or more processors and the wireless network server to determine whether a subscription exists.

28. The wireless network server of claim 25 wherein the update event comprises one or more of a predetermined time period, a predetermined distance that the wireless client has traveled, and a network reconfiguration.

29. The wireless network server of claim 25 wherein, to determine physical route information, the one or more modules further comprises instructions operable to cause the one or more processors and the wireless network server to:
   determine coverage hole information; and
   include a coverage hole notification in the direction response.

30. The wireless network server of claim 25 wherein the physical route information and the wireless access point route information are based at least in part on one or more of coverage hole policies and security policies.

31. A method for providing route information, the method comprising:
   receiving a direction request identifying a destination in a physical region;
   estimating a current location of a wireless client;
   determining credential and black list information associated with the wireless client;
   determining physical route information based on the current location, wherein if the wireless client is not authorized to enter one or more particular zones, determining physical route information based at least in part on the credential and black list information;
   determining a wireless access point route information to the destination based on the physical route information; and
   transmitting a direction response, wherein the direction response comprises the physical route information and the wireless access point route information.

32. The method of claim 31 further comprising identifying the wireless access points based on their proximity to the physical route.

33. The method of claim 31 further comprising determining whether a subscription exists.

34. The method of claim 31 wherein the update event comprises one or more of a predetermined time period, a predetermined distance that the wireless client has traveled, and a network reconfiguration.

35. The method of claim 31 further comprising:
   determining coverage hole information; and
   including a coverage hole notification in the direction response.

36. The method of claim 31 wherein the physical route information and the wireless access point route information are based at least in part on one or more of coverage hole policies and security policies.

37. A system for providing route information, the system comprising:

a wireless client operable to transmit a direction request identifying a destination in a physical region; and an apparatus operable to receive the direction request, estimate a current location of a wireless client, determine physical route information based on the current location, determine a wireless access point route information to the destination based on the physical route information, and transmit a direction response to the wireless client, wherein the direction response comprises the physical route information and the wireless access point route information, wherein the wireless access point route information identifies one or more wireless access points; and wherein the wireless client is further operable to use the wireless access point route information in the direction response when roaming between wireless access points by pre-allocating resources of one or more wireless access points identified in the wireless access point route information.

38. The system of claim 37 wherein the physical route information comprises a map of at least a portion of the physical region.

39. The system of claim 37 wherein the apparatus is further operable to identify the wireless access points based on their proximity to the physical route.

40. The system of claim 37 wherein the physical route information and the wireless access point route information are based at least in part on one or more of coverage hole policies and security policies.

* * * * *